United States Patent [19]

Adams

[11] Patent Number: 4,651,841
[45] Date of Patent: Mar. 24, 1987

[54] POWER ASSISTANCE STEERING SYSTEM FOR A VEHICLE

[75] Inventor: Frederick J. Adams, Clevedon, England

[73] Assignee: TRW Cam Gears Limited, Clevedon, England

[21] Appl. No.: 694,338

[22] Filed: Jan. 24, 1985

[30] Foreign Application Priority Data

Feb. 15, 1984 [GB] United Kingdom ............... 8404003
Sep. 24, 1984 [GB] United Kingdom ............... 8424130

[51] Int. Cl.⁴ .................................................. B62D 5/06
[52] U.S. Cl. ........................................ 180/142; 180/133
[58] Field of Search ............... 180/148, 133, 139, 142, 180/79.1, 79.5, 141, 135; 74/388 PS; 60/473, 476

[56] References Cited

U.S. PATENT DOCUMENTS

| | | | |
|---|---|---|---|
| 3,820,620 | 6/1974 | Miller et al. | 180/79.2 |
| 3,896,617 | 7/1975 | Kraina | 60/403 |
| 3,901,342 | 8/1975 | Nunn, Jr. | 180/133 |
| 3,921,741 | 11/1975 | Garfinkle et al. | 180/34 |
| 4,041,704 | 8/1977 | Gygli | 60/476 |
| 4,190,130 | 2/1980 | Beck | 180/133 |
| 4,317,449 | 3/1982 | Miller | 180/133 |
| 4,343,153 | 8/1982 | Kern et al. | 60/476 |
| 4,365,684 | 12/1982 | Turner | 180/133 |
| 4,410,057 | 10/1983 | Johnson | 180/133 |
| 4,448,275 | 5/1984 | Kagawa | 180/142 |
| 4,499,964 | 2/1985 | Abe | 180/148 |

FOREIGN PATENT DOCUMENTS 0090697 10/1983 European Pat. Off. ............ 180/148

Primary Examiner—John J. Love
Assistant Examiner—Donn McGiehan
Attorney, Agent, or Firm—Tarolli, Sundheim & Covell

[57] ABSTRACT

A power assistance steering system for a vehicle, particularly a heavy vehicle, having a first power assistance subsystem known per se and a second power assistance subsystem including a fluid pump for directing fluid pressure selectively to a movement assistance device to assist steering and a prime mover for driving the pump in accordance with signals generated by a sensor responsive to steering.

4 Claims, 8 Drawing Figures

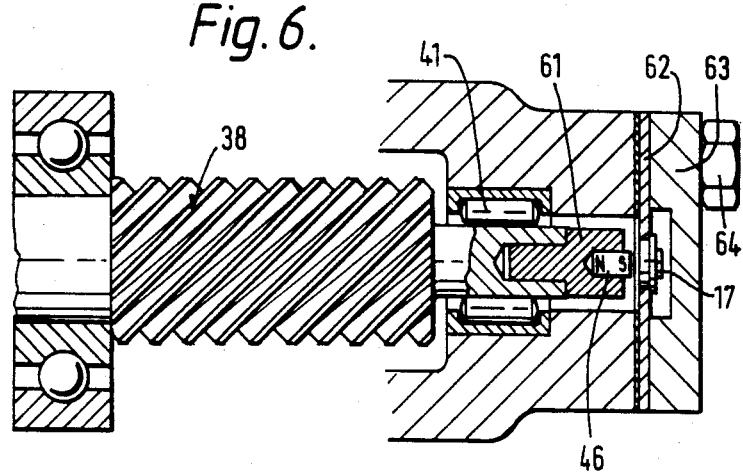
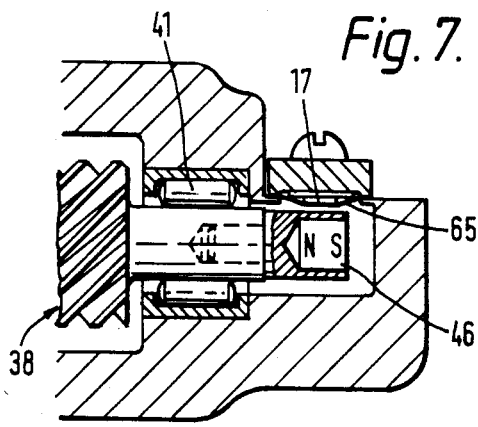

POWER ASSISTANCE STEERING SYSTEM FOR A VEHICLE

INTRODUCTION

This invention relates to a power assistance steering system for a vehicle.

Power assistance steering systems for motor vehicles are well known and conventionally include a source of fluid pressure which is selectively directed to a ram mechanism through a fluid direction control valve. This fluid direction control valve is responsive to steering torque to control the fluid pressure being fed to the ram mechanism.

The manufacture of such fluid direction control valves is complicated in that they have to be accurately machined and are therefore expensive to produce.

Similar considerations apply to the manufacture of power assistance steering systems for light motor vehicles, for example, saloon cars, and also for heavy motor vehicles, for example, trucks.

OBJECT OF THE INVENTION

It is the main object of this invention to provide a low cost power assistance steering system for a vehicle.

STATEMENT OF INVENTION

According to the present invention there is provided a power assistance steering system for a vehicle having an engine for the generation of motive power, comprising a first power assistance subsystem having an engine driven fluid pump which supplies fluid pressure via a steering valve to assist in steering the vehicle, the first subsystem being known per se, and a second power assistance subsystem including a fluid pump for directing fluid pressure selectively to a movement assistance device to assist steering and a prime mover for driving said pump in accordance with signals generated by a sensor responsive to steering.

DRAWINGS

FIG. 6 is a cross-sectional scrap view illustrating sensor mechanism;

FIG. 7 is a cross-sectional scrap view illustrating an alternative form of sensor mechanism.

SPECIFIC DESCRIPTION

Figure 1:
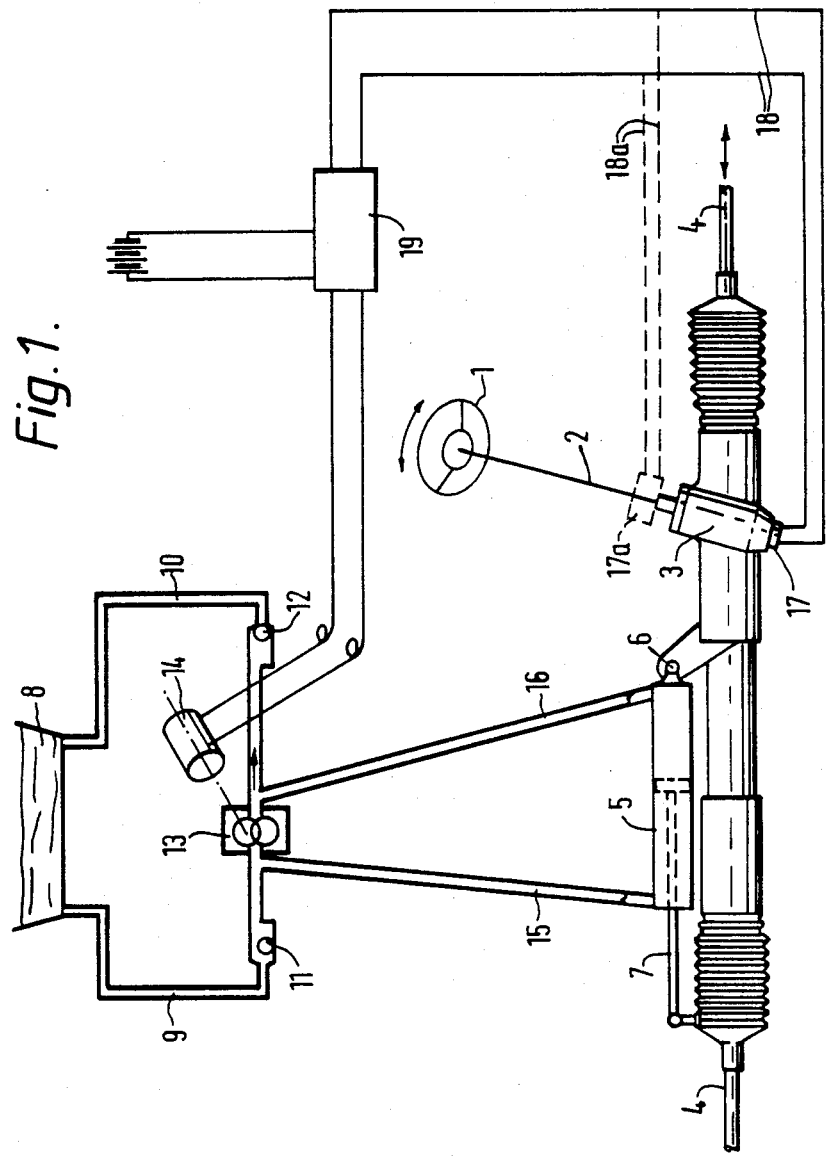
FIG. 1 is a diagrammatic view of a first embodiment of a power assistance steering subsystem.

Referring first to FIG. 1 which illustrates a basic power assistance steering subsystem in a vehicle, there is shown a steering wheel 1 with a torque transmitting steering column 2 leading to a rack and pinion steering assembly in housing 3. Movement transmitting rods 4 lead to the steered wheels in known manner.

A ram 5 or other movement assistance device has its cylinder part fixed at 6 and its piston part attached through links 7 to assist in the axial movement of rods 4 again in known manner. The movement assistance device may be connected to the rod 4.

Fluid is stored in reservoir 8 and passes through pipes 9 and 10 through one way valves 11 and 12 dependent upon the sense of rotation of a pump 13 driven by a reversible electric motor or other reversible prime mover 14. Fluid pressure generated by pump 13 is applied via pipes 15 and 16 selectively to one or other of the sides of the piston of ram 5.

The one way valves 11 and 12 may be omitted from the system and the pump 13 simply driven selectively to either side of the ram 5 through pipes 15 and 16. However, if the ram 5 is of the type in which different pressure areas are present on the opposite sides of the piston, provision must be made for the differential flow of the fluid dependent on the direction of movement of the piston. Such provision may be achieved by the one way valves 11 and 12 or their equivalent.

Attached to the housing 3 of the rack and pinion assembly is a torque sensor 17 having electrical connections 18 leading to a microprocessor 19 charged by batteries 20 and the output from the microprocessor 19 being fed via leads 21 to electric motor 14.

Alternatively, the torque sensor 17a is in the form of a rotary device which transmits a signal via electrical connection 18a.

More details of the precise components will be described later but suffice to say at the moment that any significant amount of steering torque applied at steering wheel 1 will be converted into an electrical signal by sensor 17 or 17a, fed to the microprocessor 19 which in turn will feed an appropriate signal to electric motor 14. The motor will turn and drive pump 13 in the appropriate direction to pressurise one or other side of the piston of ram 5 to assist in movement of the steering rods 4. There will, of course, be direct drive through steering column 2 to rods 4 as is conventional practice.

Figure 2:
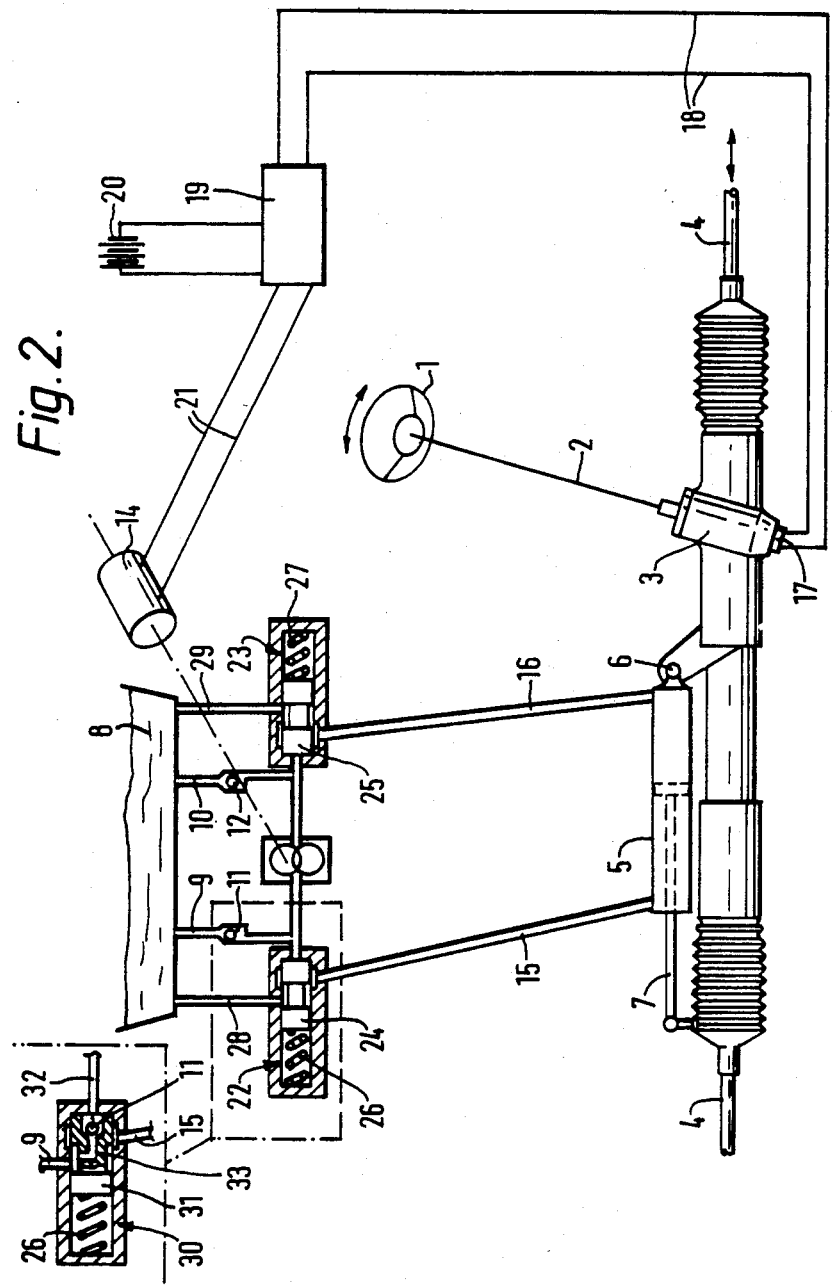
FIG. 2 is a diagrammatic view of a second embodiment of a power assistance steering subsystem.

In FIG. 2 and the remaining figures, like parts have been given like reference numerals to accord with FIG. 1.

Referring now to FIG. 2, in this embodiment in addition to the opposed one way valves 11 and 12 there are provided spool valves 22 and 23, the spools 24 and 25 of which are held in the position shown in the drawing by light springs 26 and 27 respectively. These spool valves 22 and 23 have additional pipes 28 and 29 respectively leading back to reservoir 8.

The purpose of the spool valves 22 and 23 is to permit an unrestricted flow of fluid back through pipes 15 or 16 which may be caused by a very increased torque being applied through steering wheel 1 or shock loading conditions causing fluid to flow through spool valves 22 and 23 and pipes 28 and 29 back to reservoir 8. These spool valves 22 and 23 also assist in the rapid centering of the piston of ram 5. The spool valves 22 and 23 do not affect the fluid pressure applied through pipes 15 and 16 from pump 13 because the spools 24 and 25 are easily moved against their springs 26 and 27 respectively.

A variation of this embodiment in which one of the one way valves and one of the spool valves are combined into a single valve is indicated at 30 and this avoids the use of pipe 28. Pipe 9 extends from the reservoir 8 directly between the lands of modified spool 31 and connects to pipe 32 which leads to pump 13 via internal passageway 33 within which is one way valve 11. The valve 30 operates as previously described in connection with the separate valves 11 and 22.

Figure 3:
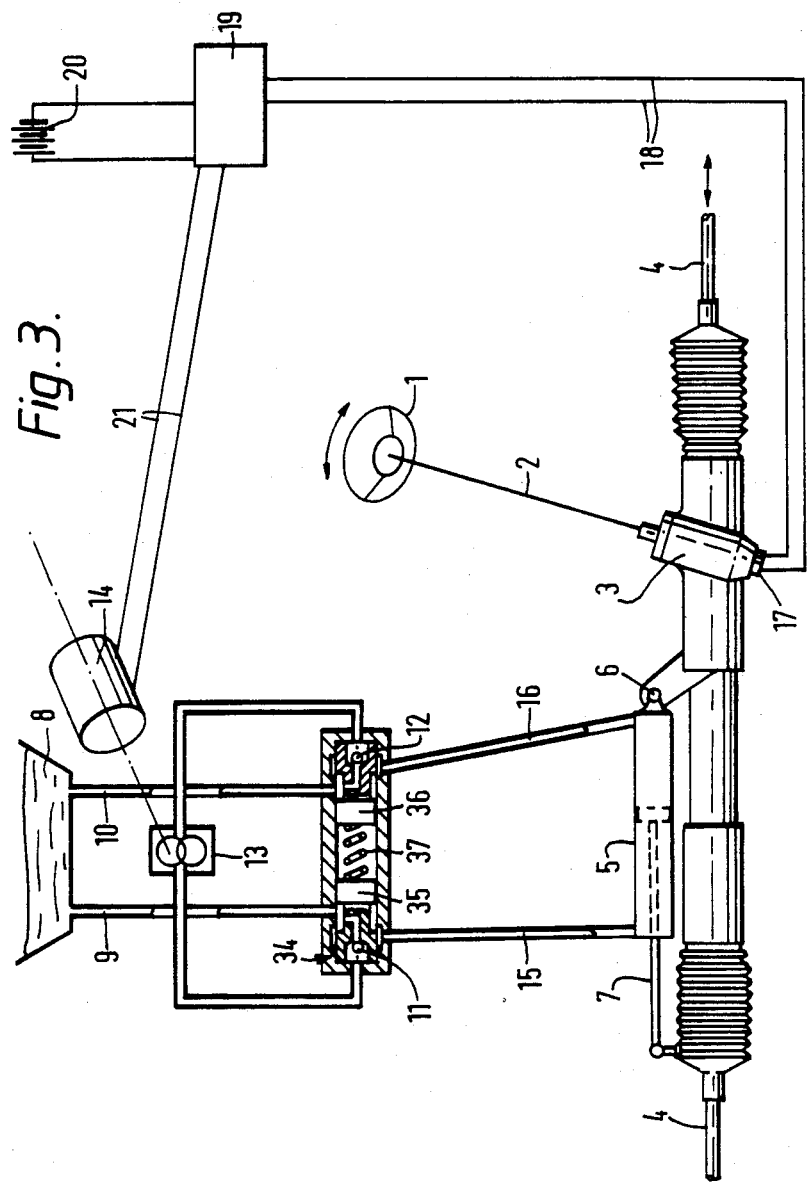
FIG. 3 is a diagrammatic view of a modification of the subsystem of FIG. 2.

Referring now to FIG. 3 which shows a modification of the embodiment of FIG. 2 and in particular a valve arrangement 34 which combines the two valves 30 of the FIG. 2 embodiment. In the FIG. 3 embodiment fluid is fed via pipes 9 and 10 to between the lands of spools 35 and 36 respectively which incorporate one way valves 11 and 12. The spools 35 and 36 are spring loaded by common light spring 37.

The FIG. 3 embodiment operates in a manner similar to that of FIG. 2 and permits rapid return of fluid pressure from ram 5 to reservoir 8 through either pipe 15 or pipe 16.

Figure 4:
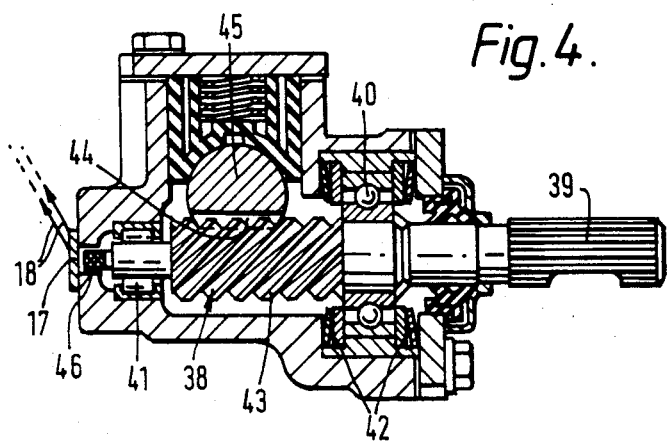
FIG. 4 is a cross-sectional view showing a first form of rack and pinion mechanism.

A first embodiment of an axially moveable pinion in a rack and pinion assembly is illustrated in FIG. 4. A pinion 38 is provided with a splined end 39 for attachment to steering column 2 and is mounted for rotation in bearings 40 and 41 and centered against axial movement by springs 42. The pinion is provided with helical teeth 43 which engage inclined teeth 44 of rack 45.

At the free end of pinion 38 is a permanent magnet 46 located in its rest position adjacent to the sensor 17. This sensor may be what is known as a "Hall" sensor or any other type of sensor which is sensitive to the movement of a nearby permanent magnet.

In operation, a very small amount of torque from the steering wheel will be transmitted directly from the pinion to the rack without overcoming the centering of the pinion by springs 42. However, if more substantial torque is applied, the pressure of one of the springs 42 will be overcome because due to the angular contact of the helical teeth 43 of the pinion and the similarly inclined teeth 44 of the rack, axial movement of the pinion will take place. The magnetic field generated by permanent magnet 46 will cause a signal to be generated in sensor 17, this signal being dependent upon the direction and degree of the movement between the magnet 46 and the sensor 17. This movement will be transmitted to the microprocessor 19 which will generate a signal to send to the motor 14 to turn the pump 13 at sufficient speed to raise the fluid pressure at one side of the piston in ram 5 to give the required speed of movement to assist in steering the vehicle.

As soon as the steering torque from steering wheel 1 ceases, then the springs 42 will re-centralise the pinion 38 in preparation for the next steering movement.

Figure 5:
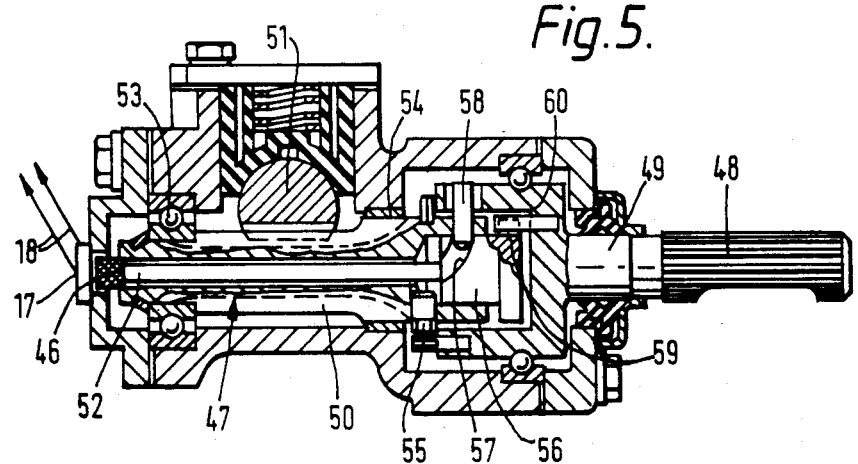
FIG. 5 is a cross-sectional view showing a second form of rack and pinion steering mechanism.

FIG. 5 shows a second embodiment of rack and pinion steering mechanism. The pinion 47 is provided with splines 48 for attachment to the steering column 2. The pinion 47 is made in three main parts, namely, the head portion 49 which includes the splined shaft 48, the outer pinion part 50 which is provided with axial teeth to engage lateral teeth of rack 51 in normal manner and a central rod part 52 which is the axially moveable part of the pinion mechanism. The central rod part 52 is free for rotation within outer pinion part 50 and is capable of axial movement in relation thereto. The outer pinion part 50 is mounted for rotation in bearings 53 and 54 and is connected to head part 49 through springs 55 which centre the head part 49 in relation to the outer pinion part 50 when no significant torque is being transmitted.

An enlarged portion 56 of the central rod 52 is provided with a cam surface 57 engaged by a pin 58 mounted on the head part 49. The enlarged part 56 also contains a slot 59 within which extends a pin 60 fixed on head part 49 thus enabling central rod part 52 to rotate and move axially within outer pinion part 50.

If significant torque is applied to part 49, this will rotate both the part 49 and the central rod part 52. The springs 55 will give and the engagement of pin 58 with cam 57 will move central rod part 52 axially one way or the other dependent upon the sense of rotation of part 49 and, as in the previous embodiment, a magnet 49 will create a signal in sensor 17 which signal will be sent via wires 18 to the microprocessor. As soon as the steering torque ceases, the springs will axially re-centralise the central part 52 ready for the next steering movement.

FIG. 6 shows in more detail the magnet and sensor arrangement and relates in particular to the embodiment of FIG. 4. The pinion 38 has at its free end the permanent magnet 46. This is mounted in a brass plug 61. The sensor 17 is mounted on a brass plate 62 and a brass cover 63 is secured by bolts 64. A small air gap is left between the free end of the magnet 46 and the sensor 17 to permit axial movement of the pinion.

A modified arrangement for the sensor is shown in FIG. 7 in which the sensor 17 is placed at the side of the magnet 46 separated by a gasket 65.

The sensor may be sensitive solely to the direction of steering if a non-sophisticated system is satisfactory but may alternatively be sensitive not only to the direction of steering but also to steering torque.

Each of the subsystems described above may be combined with a second subsystem, known per se, which makes the invention eminently suitable to provide power assistance for heavy vehicles. The second subsystem will be the main power assistance system and the first subsystem will only become operational if the second subsystem fails. As an example, such a system is illustrated in FIG. 8 in which like reference characters have been accorded to like parts as in the previously described embodiment of FIG. 1.

Figure 8:
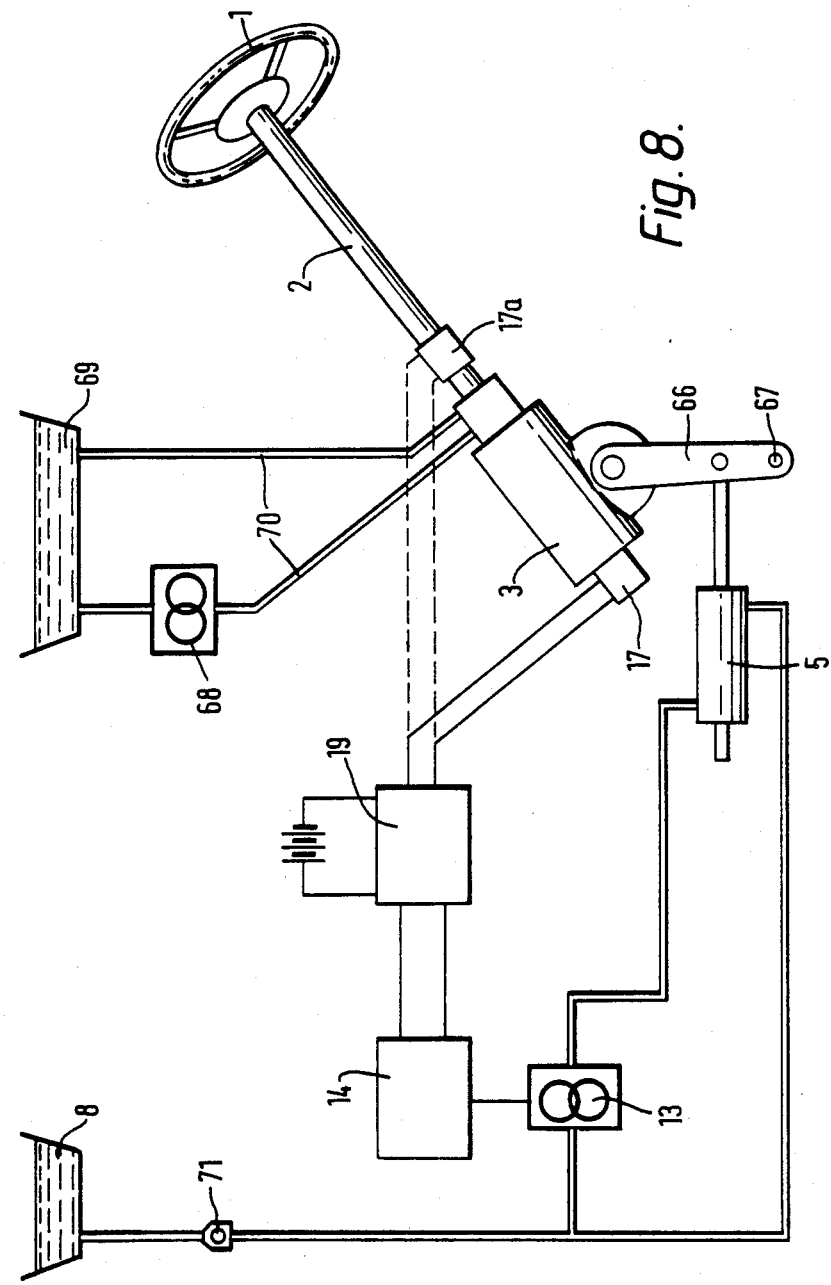
FIG. 8 is a diagrammatic view of a power assistance steering system in accordance with the invention.

In FIG. 8, a steering wheel 1 with a torque transmitting steering column 2 leads to a steering assembly which may be a recirculating ball piston motor in housing 3. A drop arm 66 provides the output from the recirculating ball piston motor which drop arm 66 is connected at 67 to the steering linkage of the vehicle in known manner.

The main power assistance is provided by an engine driven pump 68 supplied with fluid from a reservoir 69 through pipeworks 70. These components form one power assistance subsystem known per se.

A second power assistance subsystem comprises one or other of the first or second embodiments above described and, as indicated in FIG. 8, includes a reservoir 8 which supplies fluid through a valve 71 to permit the passage of fluid between the circuit and the reservoir to ensure that the circuit is always full and to enable fluid to expand due to temperature changes. In this second subsystem is a pump 13 driven by an electric motor 14 supplied by signals from a microprocessor 19 dependent on the position of the torque sensor 17. The pump 13 selectively feeds fluid pressure to a ram 5 which preferably has a piston with equal pressure areas on both sides thereof thus obviating any complications which might ensue by unequal flow of the pressure fluid dependent on the sense of rotation of the steering wheel.

As described above in connection with FIG. 1, steering signals may be fed to the microprocessor from an alternative torque sensor 17a on the steering column.

I claim:

1. A power assistance steering system for a vehicle having an engine for generating motive power, said power assistance system comprising:

a first power assistance system including a first fluid pump driven by said engine for providing fluid pressure for power assistance and steering control valve means for controlling fluid pressure delivered from said fluid pump; and a second power assistance system including a fluid pressure device for providing power assistance to steering and having opposite chambers, a second fluid pump, a variable speed prime mover means for selectively driving said second fluid pump in opposite directions to selectively direct fluid pressure to said opposite chambers of said fluid pressure device, sensor means for sensing steering torque and generating a signal which is a function of the steering torque, and control means for controlling the speed of operation of said prime mover means to drive said second fluid pump at a speed which is a function of the steering torque for directing fluid pressure to said fluid pressure device in accordance with steering demand as sensed by said sensor means.

2. A power assistance steering system as set forth in claim 1 wherein said second power assistance system comprises a reservoir and valve means for controlling fluid flow from said reservoir to said second fluid pump.

3. A power assistance system as set forth in claim 1 or 2 wherein said prime mover means is a reversible electric motor, and said sensor means senses the direction of the steering torque for actuating said reversible electric motor in a corresponding direction.

4. A power assistance steering system as set forth in claim 1 or 2 wherein said fluid pressure device comprises a piston having equal pressure areas on both sides thereof.

* * * * *